(12) United States Patent
Fewtrell (10) Patent No.: US 9,715,439 B1
(45) Date of Patent: Jul. 25, 2017

(54) EMBEDDED DEFECT REPORTING SYSTEM (71) Applicant: Amazon Technologies, Inc., Reno, NV (US)

(72) Inventor: Zachary Ganwise Fewtrell, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 437 days.

(21) Appl. No.: 13/858,278

(22) Filed: Apr. 8, 2013

(51) Int. Cl.
*G06F 9/44* (2006.01)
*G06F 11/36* (2006.01)
*G06F 11/32* (2006.01)

(52) U.S. Cl.
CPC .......... *G06F 11/362* (2013.01); *G06F 11/323* (2013.01); *G06F 11/3664* (2013.01); *G06F 11/3688* (2013.01)

(58) Field of Classification Search
CPC . G06F 11/3664; G06F 11/3688; G06F 11/323
USPC ........................................................ 717/125
See application file for complete search history.

(56) References Cited

U.S. PATENT DOCUMENTS

| | | | |
|---|---|---|---|
| 6,629,267 B1 | 9/2003 | Glerum et al. | |
| 6,754,702 B1 * | 6/2004 | Kennelly | H04L 41/024 709/223 |
| 7,392,510 B1 * | 6/2008 | Treder | G06F 17/3089 709/224 |
| 8,010,845 B2 | 8/2011 | Rui et al. | |
| 8,060,869 B1 | 11/2011 | Panchenko et al. | |
| 8,185,651 B2 | 5/2012 | Moran et al. | |
| 8,335,817 B1 * | 12/2012 | Dayan | 709/203 |
| 8,359,396 B2 * | 1/2013 | Chan et al. | 709/229 |
| 9,122,803 B1 * | 9/2015 | Michelsen | G06F 11/3684 |
| 2004/0117731 A1 * | 6/2004 | Blyashov | G06F 17/211 715/222 |
| 2005/0081108 A1 | 4/2005 | Shabalin | |
| 2007/0115860 A1 | 5/2007 | Samele et al. | |
| 2007/0239733 A1 * | 10/2007 | Tanzy | G06F 17/3089 |
| 2008/0263406 A1 | 10/2008 | Prescott et al. | |
| 2009/0089629 A1 * | 4/2009 | Hawkins | G06F 11/0709 714/100 |
| 2009/0300056 A1 * | 12/2009 | Fu | G06F 17/30938 |
| 2010/0218053 A1 * | 8/2010 | Eickmeyer et al. | 714/57 |
| 2011/0271149 A1 * | 11/2011 | Roussel | H04L 41/0253 714/46 |
| 2012/0151362 A1 * | 6/2012 | Narayanan | H04L 41/0893 715/736 |

FOREIGN PATENT DOCUMENTS

WO WO2001009794 * 2/2001 .............. G06F 9/46

* cited by examiner

*Primary Examiner* — John Chavis
(74) *Attorney, Agent, or Firm* — Thomas | Horstemeyer, LLP (57) ABSTRACT

Disclosed are various embodiments for a user interface builder for application. The user interface builder may embed defect reporting logic into the user interface of an application to aid in the description and reporting of defects. Defect reporting logic is embedded if particular flags, variables or other indicators are set directing the user interface builder application to embed the additional defect reporting logic during the generation of a user interface. When the defect reporting logic is embedded within the user interface of the application, a user may click on and automatically file defect reports for various components of the application.

22 Claims, 8 Drawing Sheets

“EMBEDDED DEFECT REPORTING SYSTEM

BACKGROUND

User interfaces, such as network pages or web pages served up by electronic commerce systems generally comprise a plurality of components that allow a user to interact with various components of an application. Responsibility for defects within each user interface component or associated application component may lie with one of a plurality of different development teams or individuals. Further, each component of a user interface, such as a network page, may comprise one or more sub-components, each with a different development team or individual responsible for defects. Therefore, it is often difficult or impractical to determine the appropriate person or team to whom defects in an application should be reported.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application describes a system for embedding information into objects or components of a network page, such as a web-page, to facilitate defect reporting. Each object or component is tagged with information regarding the team or individual responsible for handling defects within a particular object or component. Further, each object or component may have additional fields defined that enumerate required fields or necessary information for a defect report. Some fields may be automatically populated with data known to the application at run time, while information for other fields may be obtained from the user through a reporting wizard or other user interface elements. In the following discussion, a general description of the system and its components is provided, followed by a discussion of the operation of the same.

Figure 1:
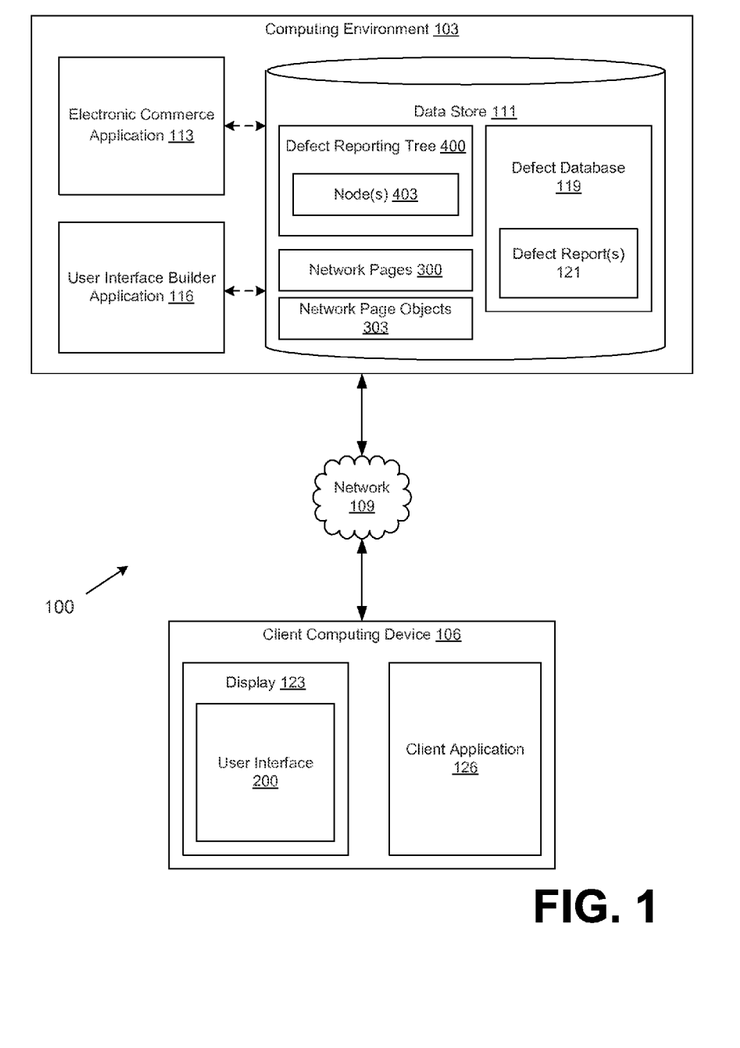
FIG. 1 is a drawing of a networked environment according to various embodiments of the present disclosure.

With reference to FIG. 1, shown is a networked environment 100 according to various embodiments. The networked environment 100 includes a computing environment 103 and a client computing device 106 which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 111 that is accessible to the computing environment 103. The data store 111 may be representative of a plurality of data stores 111 as can be appreciated. The data stored in the data store 111, for example, is associated with the operation of the various applications and/or functional entities described below. The components executed on the computing environment 103, for example, include an electronic commerce application 113, a user interface builder application 116, and other applications, services, processes, systems, engines, or functionality not discussed in detail herein.

The electronic commerce application 113 is executed in order to facilitate the online purchase of items over the network 109. The electronic commerce application 113 also performs various backend functions associated with the online presence of a merchant in order to facilitate the online purchase of items as will be described. For example, the electronic commerce application 113 generates network pages 300 such as web pages or other types of network content that are provided to clients computing devices 106 for the purposes of selecting items for purchase, rental, download, lease, or other form of consumption as will be described.

The user interface builder application 116 is executed to generate a user interface for an application. In an illustrative and non-limiting example, the user interface builder application 116 is executed to generate one or more network pages 300 to be provided to the client computing device 106 on behalf of the electronic commerce application 113. However, it is understood that the user interface builder application 116 may be used separately and independently of the electronic commerce application 113 and is not limited to generating or assembling network pages 300. As an illustrative and non-limiting example, the user interface builder application 116 may be used in conjunction with a compiler or as a component of a software development environment or a software development toolchain to generate user interfaces for standalone applications executing in or accessible from one or more client computing devices 106.

The data stored in the data store 111 includes, for example, one or more network pages 300 or network page objects 303, a defect reporting tree 400 and associated nodes 403, a defect database 119, one or more defect reports 121, and potentially other data.

Network pages 300 may correspond to web pages or other pages accessible by a client computing device 106 across a network 109. Alternatively, network pages 300 may correspond to other types of network content accessible by a client computing device 106 across a network 109. Network pages 300 may comprise one or more network page objects 303, such as images, tables, forms and form fields, audio tracks, embedded video, text, frames, and other objects. Network page objects 303 may be independent components or may be further comprised of other network page objects 303. For example, a table may in fact be a table of tables or a table of images. Network pages 300 may also be viewed as an example of a user interface 200, and network page objects 303 may be considered to be representative of components of the user interface 200.

The defect database 119 is a store for one or more defect reports 121. Defect reports 121 are reports representing defective components of an application represented by the user interface 200, such as the electronic commerce application 113 as represented through a plurality of network pages 300. Defect reports 121 may include a number of fields, including a description, a date or time stamp, a severity level, and attributes or values reflecting the particular component or components of the application affected.

Figure 4:
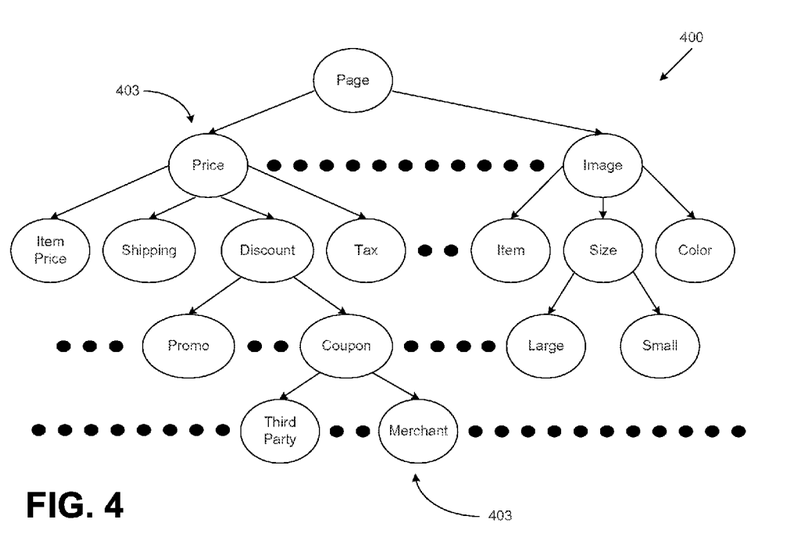
FIG. 4 is a drawing of an example of a defect reporting tree referenced by the page builder application depicted in the networked environment of FIG. 1 comprising at least one node representing the information required for reporting a defect and the point of contact for reporting defects according to various embodiments of the present disclosure.

The defect reporting tree 400 comprises one or more nodes 403. Each node 403 corresponds to a particular user interface component such as a network page object 303 comprising a component of one of a plurality of network pages 300 generated by the user interface builder application 116 for use by the electronic commerce application 113. The arrangement of the nodes in a tree structure corresponds to the arrangement of or relationship between user interface objects. As an illustrative but non-limiting example, the arrangement of the nodes 403 comprising the defect reporting tree 400 may mirror the document object model (DOM) tree of the network page objects 303 comprising a network page 300. As another illustrative but non-limiting example, the arrangement of the nodes 403 may mirror the object inheritance for the data structures or objects comprising the data model for an application following the model-view-controller (MVC) paradigm. In some embodiments of the present disclosure, an application may be represented by multiple defect reporting trees 400.

In other embodiments of present disclosure, an application may be represented by multiple defect reporting trees 400 which are linked to or otherwise cross-reference each other. These linked defect reporting trees 400 may be considered a single three-dimensional defect reporting tree 400 or may be represented as a forest of defect reporting trees 400. As an illustrative and non-limiting example, an application may have a defect reporting tree 400 corresponding to the user interface 200 of an application, a second defect reporting tree 400 corresponding to the logic of the application, and a third defect reporting tree 400 corresponding to the data model or programmatic state of the application. Links between individual nodes 403 of the multiple trees may correspond to connections between the user interface 200 and the underlying application logic or data model.

The client computing device 106 is representative of a plurality of client devices that may be coupled to the network 109. The client computing device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client computing device 106 may include a display 123. The display 123 may comprise, for example, one or more devices such as liquid crystal display (LCD) displays, gas plasma-based flat panel displays, organic light emitting diode (OLED) displays, LCD projectors, or other types of display devices, etc.

The client computing device 106 may be configured to execute various applications such as a client application 126 and/or other applications. The client application 126 may be executed in a client computing device 106, for example, to access network content served up by the computing environment 103 and/or other servers, thereby rendering a user interface 200 on the display 123. To this end, the client application 126 may comprise, for example, a browser, a dedicated application, etc., and the user interface 200 may comprise a network page, an application screen, etc. The client computing device 106 may be configured to execute applications beyond the client application 126 such as, for example, email applications, social networking applications, word processors, spreadsheets, and/or other applications.

Next, a general description of the operation of the various components of the networked environment 100 is provided. Although the examples provided herein are in the context of a network application, such as a web application, where the application logic and application data model are located in the computing environment 103 and the application user interface 200 is located in the client computing device 106, it is understood that the principals illustrated by this example embodiment apply to other embodiments than network applications.

To begin, the client computing device 106 sends a request across the network 109 to the electronic commerce application 113 for a network page 300. The request is processed by the user interface builder application 116, which assembles the network page 300 from one or more network page objects 303. The network page 300 is subsequently returned by the electronic commerce application 113 to the client computing device 106 and rendered on the display 123 as user interface 200.

Before assembling the network page 300, the user interface builder application 116 checks to see if one or more debug flags have been set or otherwise specified as part of the request. For example, a variable in a query string of a URL may indicate that debugging is enabled or disabled. Typically, debug flags may only be set or specified by authorized users such as application developers, quality assurance engineers, or other authorized personnel. To prevent unauthorized use of debug flags, requests containing debug flags might, for example, only be honored if originating from specific IP addresses. Alternatively, the debug flags might have to be submitted in combination with a username and password or other authentication credentials. It is understood that other methods of authorization may be employed as appropriate, either as an alternative to or in conjunction with the examples provided.

If a debug flag is set or enabled, the user interface builder application 116 begins to assemble the requested network page 300 from one or more network page objects 303. Each network page object 303 will have appropriate defect reporting logic or attributes embedded within the network page object 303 as defined by a corresponding node 403 of the defect reporting tree 400. No defect reporting logic is embedded if a debug flag is not set or otherwise enabled.

The user interface builder application 116 determines the appropriate debugging logic to embed within each network page object 303 by consulting a defect reporting tree 400 comprising one or more nodes 403. Each network page object 303 used to assemble the network page 300 has a corresponding node 403 within the defect reporting tree 400. Each node contains data describing the necessary defect reporting attributes and logic to embed in each network page object 303.

Such data with each node 403 may include the required fields for a defect report 121 related to the network page object. Such data may also include whether one or more required fields can be programmatically filled by the client application 126 or the electronic commerce application 113. In addition, the node 403 may comprise information regarding the entity or entities who should receive a defect report 121 related to the particular network page object 303. The node 403 may also comprise other information necessary for the proper filing of an accurate and detailed defect report 121 as required by any of the various embodiments of the present disclosure.

In some embodiments of the present disclosure, a node 403 may further comprise common user errors or misunderstandings that are commonly reported as defects but are not, in fact, defects. For example, a user may believe that certain features, conditions, information, or behavior of the application is a bug when in fact the application is acting as intended. As a non-limiting example, a user shopping with an electronic commerce application 113 may erroneously believe that he or she is entitled to free shipping, without realizing that his or her order fails to meet one or more criteria for free shipping. For example, an individual item within the order may not qualify for free shipping or the subtotal for the order may be below a qualifying threshold for free shipping. Such qualifications or thresholds may be included in the node 403.

Upon assembly of the network page 300 by the user interface builder application 116, the electronic commerce application 113 returns the requested page to the client application 126 executing on the client computing device 106. The network page 300 is subsequently rendered on the display 123 of the client computing device as a portion of the user interface 200 of the client application 126.

Assuming that defect reporting logic was embedded in the network page 300 returned to the client computing device 106, a user may interact with any network page object 303 to file a defect report 121 related to the particular network page object 303. To file a defect report 121, the user would interact with the network page object 303 rendered as a portion of the user interface 200 on the display 123 of the client computing device 106. Such an interaction may comprise a mouse-click, a touch gesture on a touch screen, a keyboard shortcut, or other interaction appropriate for the particular type of client computing device 106 in use.

When the defect report 121 has been completed by the user, the user submits the defect report 121. The client computing device 106 then transmits the defect report 121 across the network 109 to be filed in the defect database 119 in the data store 111. Transmission may be accomplished by email, a request to network service, or by other similar means. For example, the client application may make a request to a network service API such as a web service using the hypertext transfer protocol (HTTP), simple object access protocol (SOAP), or the representational state transfer (REST) protocol.

Figure 2A:
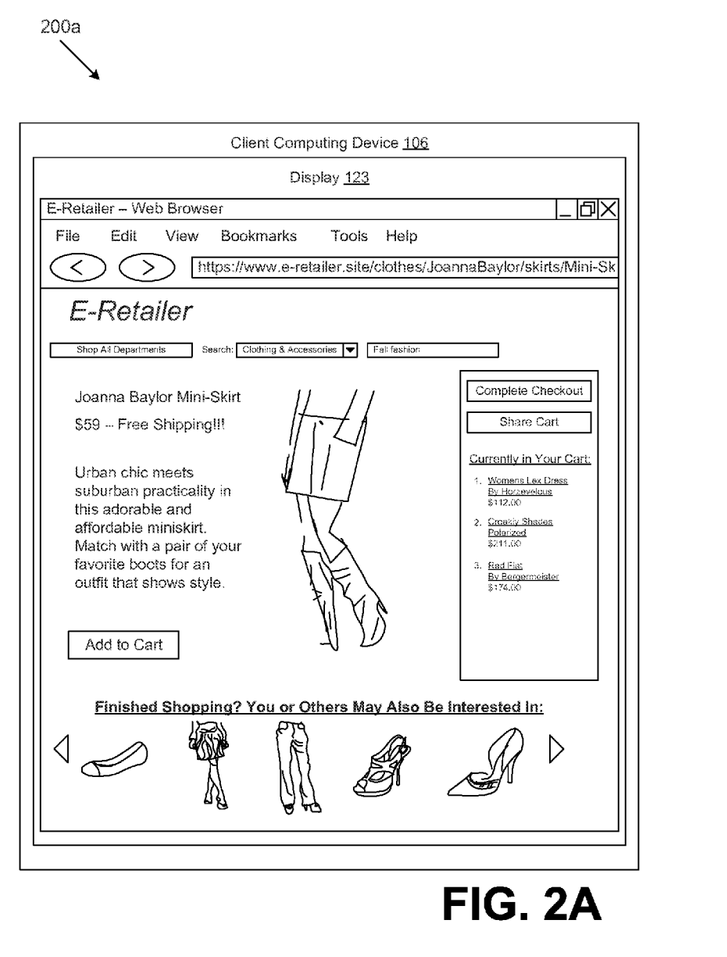
FIGS. 2A-C are drawings of an example of a user interface rendered by a client in the networked environment of FIG. 1 according to various embodiments of the present disclosure.

Referring next to FIG. 2A, shown is example user interface 200, denoted herein as user interface 200a, according to various embodiments of the present disclosure. In this particular embodiment, user interface 200a is generated by the client application 126 (FIG. 1) and rendered on the display 123 of the client computing device 106 in response to receiving a requested network page 300 (FIG. 1). More specifically, user interface 200a represents a rendered network page 300 (FIG. 1), in the form of a web page, as requested by a user of the client application 126 executing on the client computing device 106. It is understood that other embodiments of the present disclosure may make use of alternative network content other than web pages or may comprise alternative user interfaces.

It should be noted that user interface 200a can represent either a network page 300 with or without embedded defect reporting logic. The presentation, appearance, and functionality of the network page 300 is not diminished by the addition of embedded defect reporting logic. Such equivalence is necessary in order for testing to of the electronic commerce application 113 (FIG. 1) and the user interface builder application 116 (FIG. 1). If the production or live version of the rendered network page 300 differs from the test version of the network page 300 with embedded defect reporting logic, then defects in the live or production versions of the rendered network page 300 may not be detected.

Figure 2B:
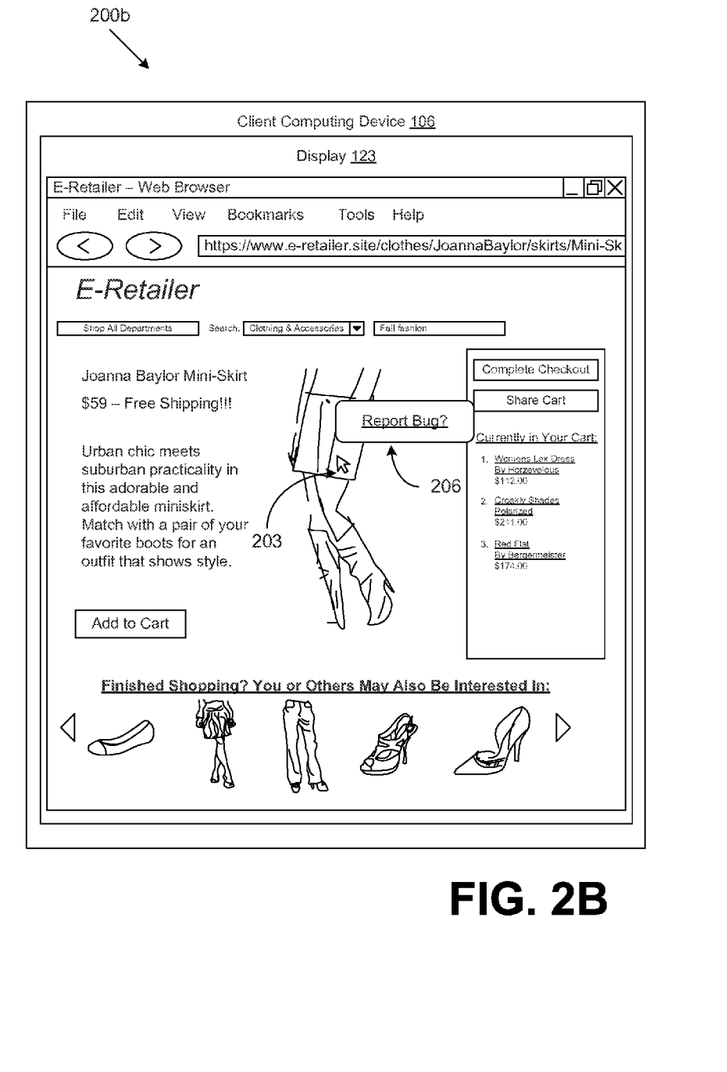

Turning now to FIG. 2B, shown is example user interface 200, denoted herein as user interface 200b, according to various embodiments of the present disclosure. The user interface 200b represents a network page 300 (FIG. 1), in the form of a web page, rendered on a display 123 of a client computing device 106, the network page 300 comprising network page objects 303 (FIG. 1) that include embedded defect reporting logic. For those embodiments of the present disclosure that use alternative network content other than web pages or make use of alternative user interfaces, it is understood that corresponding components might use embedded reporting logic.

The existence of the embedded defect reporting logic is exposed when a user interacts with a network page object 303. In this particular embodiment of the present disclosure, a use interacts with the user interface 200b by using a mouse cursor 203 to click on an image. The mouse-click has exposed a balloon box 206 that prompts the user to report a defect. Were the user to use the mouse cursor 203 to click on the balloon box 206, the defect reporting logic embedded in the image would begin the process of obtaining information from the system and the user to file a defect report 121 (FIG. 1).

It is understood that other embodiments of the present disclosure may obtain user interactions to file defect reports 121 in other ways. For example, the user could move the mouse cursor 203 over a particular network page object 303 and expose a balloon box 206 with the mouse-over instead of the mouse-click. Other types of client computing devices, such as touchscreen devices, may not even use a mouse cursor or mouse-click to expose the defect reporting logic embedded within the network page 300 or particular network page objects 303. It is understood that the manner in which the user interaction is obtained may vary between various embodiments of the present disclosure without affecting the function or implementation. It is further understood that the type of client computing device 106 may influence or otherwise impact the choice for presenting one or more user interface elements for initiation of filing a defect report 121.

It is further understood that other embodiments of the present disclosure may present the option to file a defect report 121 in other ways. For example, instead of presenting a balloon box 206, the user interface 200*b* could present a dialog box, a prompt, or other user interface element.

Figure 2C:
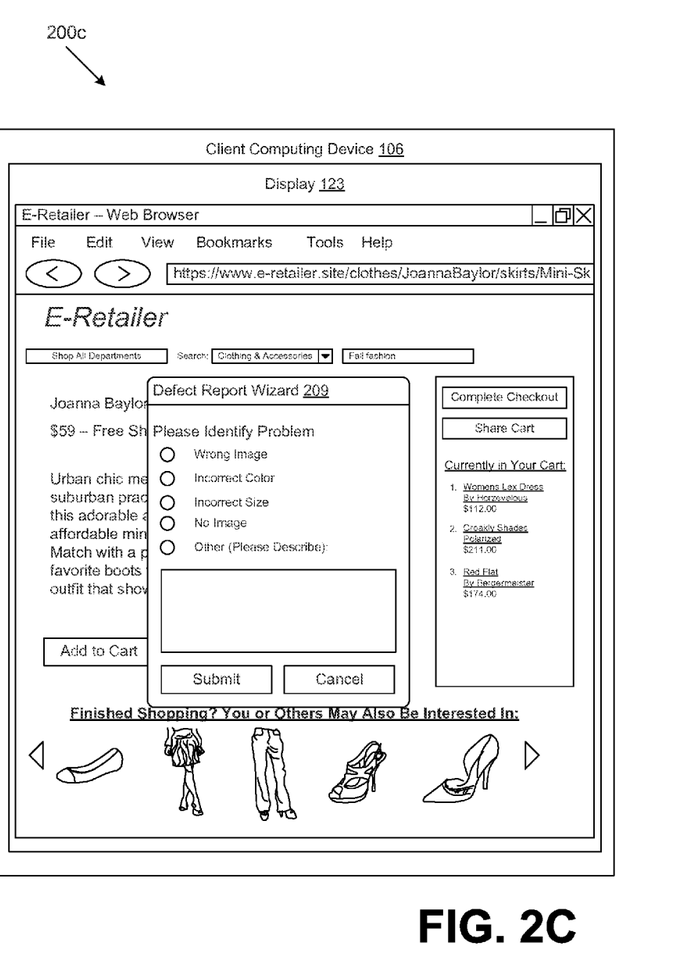

Moving on to FIG. 2C, shown is example user interface 200, denoted herein as user interface 200*c*, according to various embodiments of the present disclosure. It is assumed, for purposes of illustrating one of the many embodiments of the present disclosure, that a user has initiated the filing of a defect report 121 related to a network page object 303 representing an image within the network page 300.

The user interface 200*c* shows a defect report wizard 209 as a component of the user interface 200*c*. The purpose of the defect report wizard 209 is to aid and guide the user as the user files a defect report 121 related to a particular network page object 303. In the depicted embodiment of the present disclosure, the defect report wizard 209 lists a number of possible defects for the user to select. The list of possible defects is pulled from the defect reporting tree 400 (FIG. 4) and is based on the corresponding nodes 403 (FIG. 4) for the particular network page object 303 about which the use wishes to report a defect. The list of possible defects may correspond to defects for node 403 corresponding to the selected network page object 303 or may correspond to leaf nodes 403 representing component network page objects 303 of the selected network page object 303.

Once a user has selected an appropriate classification of the problem from the defect report wizard 209, the user may indicate his or her desire to submit the defect report 121. At this point, the defect report is transmitted by the client computing device 106 across the network 109 to the computing environment 103 (FIG. 1) for storage in the defect database 119 (FIG. 1) located in the data store 111 (FIG. 1).

In some instances, the defect report will not be sent because there is no defect with the network page object 303. A common example is "user error" where the user's expectation of the function, purpose, or other property of a particular network page object 303 is incorrect. Some user errors may be detectable based on an analysis of the defect report in comparison with information contained within the node 403 (FIG. 1) corresponding to the network page object 303. In these instances, a message, dialog, prompt, or other user interface element may be rendered clarifying or explaining the features and capabilities of the particular network page object 303.

Figure 3:
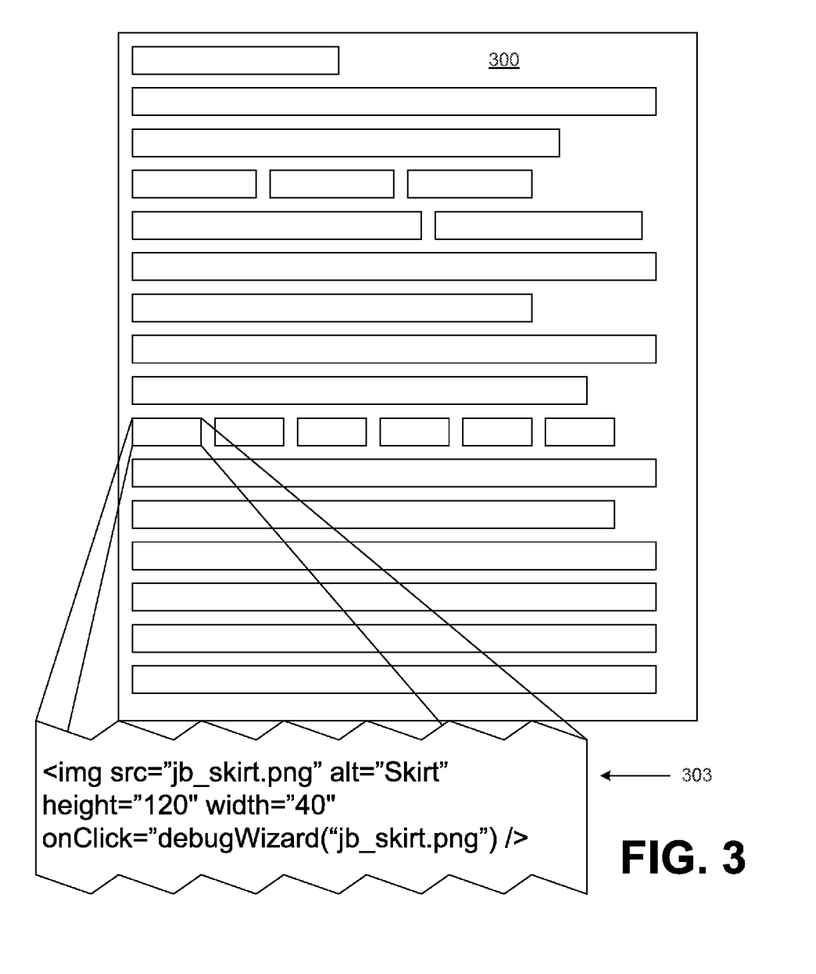
FIG. 3 is a drawing of an example of code in the network page of FIGS. 2A-C generated according to various embodiments of the present disclosure.

Referring next to FIG. 3, shown is a depiction of a network page 300, according to some embodiments of the present disclosure, represented as a webpage encoded in HTML or XHTML code depicting how the elements and object of the network page 300 may be arranged and presented by the client application 126. It is understood that the network page 300 may be represented or encoded using any number of other languages. It is further understood that alternative network content may well embed or encode components and defect reporting logic in an equivalent manner.

The network page 300 is composed of one or more network page objects 303. As illustrated in FIG. 3, each network page object 303 may have additional attributes associated with it in order to provided embedded defect reporting logic. For example, the exploded view of the network page object 303 presented in FIG. 3 shows XHTML code for presenting an image of a skirt. In the event that a user clicks on the image, a script function will be called with the network page object 303 passed to the script function as a parameter, value, or argument.

Turning now to FIG. 4, shown is an example of a defect reporting tree 400 comprising multiple nodes 403. Each node 403 corresponds to a user interface object for the user interface of an application. Continuing with the example of a network application illustrated in the previous figures, each node 403 may be seen as representing a network page object 303 (FIG. 1), which may comprise one or more other network page objects 303. The tree structure represents the hierarchical and modular nature of a network page 300 (FIG. 1). For example, a network page 300 may comprise a price of an item, an image of an item, and other components as can be appreciated. Each network page 300 generated by the user interface builder application 116 (FIG. 1) for the electronic commerce application 113 (FIG. 1) has a corresponding defect reporting tree 400.

Each node 403 in the defect reporting tree 400 further represents the information necessary for filing a defect report 121 (FIG. 1) for the corresponding network page object 303. This information includes the items of information necessary for filing an accurate defect report and the appropriate entity to notify of defects for the particular network page object 303. Each network page object 303 has a corresponding leaf or child node 403 representing the network page object 303 in the defect reporting tree 400.

Root or parent nodes 403 comprise a subset of the information contained in leaf or parent nodes 403, permitting leaf or child nodes 403 to inherit the attributes of the root or parent node 403. In instances where a root or parent node 403 is also a leaf or child node 403 of another node 403, chains of inheritance will begin to develop. This inheritance property provides additional flexibility in categorizing defect reports.

For example, a user may notice that the network page object 303 representing the total price of an item listed on a network page 300 is incorrect, but not know which specific component of the total price is incorrect. Instead of forcing the user to choose a category, which may be incorrect, the user is able to file a more general defect report related to the price.

Likewise, the tree structure permits the system to interactively aid the user in drilling down from a general problem to a more specific problem accurately described by a more specific defect report. Using the example of a pricing error, the system may be able to use data represented by the defect reporting tree 400 to interactively aid the user, through a defect reporting wizard 209 (FIG. 2) or similar interface, in narrowing the defect to a discount applied to the price, and further narrow the defect to a coupon offered by a third-party, such as a manufacturer's discount or promotional code. Once the user has narrowed down the source of the defect, the system can use the information contained in the third party coupon node to create an appropriate defect report 121 and file it to the appropriate entity, such as the development team in charge of third party coupons or the database team in charge of database of third party coupons.

Nodes 403 may be created through a number of approaches or processes. In some embodiments, nodes 403 may be created as necessary by a developer or development team in charge of the corresponding application component or object, such as a network page object 303 or other user interface objects or application objects or components. In other embodiments, nodes 403 may be automatically created through a programmatic approach that queries each object or component of an application and generates a node 403 as a function of the information returned in response to the query. In some instances, an existing relationship between the plurality of nodes can be modified in response to receiving a notification of a change in the relationship between the associated user interface objects. In some embodiments, at least one of the plurality of nodes may be removed in response to receiving a notification of a removal of at least one of the associated user interface objects.

Figure 5:
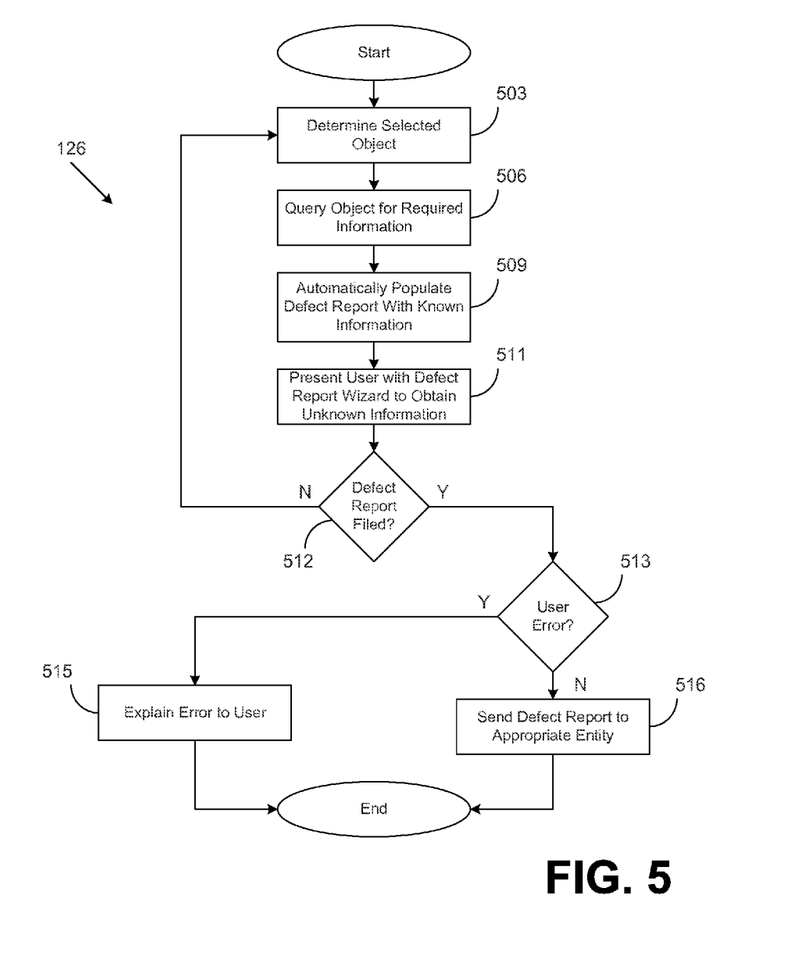
FIG. 5 is a flowchart illustrating one example of functionality implemented as portions of the page builder application executed in a computing environment in the networked environment of FIG. 1 according to the various embodiments of the present disclosure.

Moving on to FIG. 5, shown is a flowchart that provides one example of the operation of a portion of the client application 126 according to various embodiments. It is understood that the flowchart of FIG. 5 provides merely an example of the many different types of functional arrangements that may be employed to implement the operation of the portion of the client application 126 as described herein. As an alternative, the flowchart of FIG. 5 may be viewed as depicting an example of steps of a method implemented in the client application 126 (FIG. 1) according to one or more embodiments.

Beginning with box 503, it is assumed that a user has previously selected a user interface object such as a network page object 303 (FIG. 1) or similar component for filing a defect report 121. Such a user selection may comprise, for example, a mouse-click on a user interface object such as a network page object 303 of a network page 300 (FIG. 1) rendered by the client application 126, such as a web browser or other network browser, as part of a user interface 200 (FIG. 1). The client application 126 then determines which object the user selected.

Proceeding to box 506, the client application 126 queries the selected object for a list of items of information required for filing a defect report 121 for that particular object. The list may be determined or retrieved in a number of ways known to those in the art. For example, the list may be directly embedded as an attribute of the object, such as an attribute of a network page object 303. Alternatively, the list may be the result of a function call with selected object, such as a network page object 303, passed to the function as an argument.

Moving to box 509, the client application 126 automatically populates the fields of defect report 121 with information already known to or readily determined by the client application 126. Automatically populating as many fields of the defect report 121 as possible with information already known to the system has a number of advantages. First, automatic population of fields ensures that necessary information is not omitted from the defect report 121. Second, automatic population of fields improves the overall quality of defect reports 121 because information is provided in a consistent and useable format. Information provided by users tends to vary in quality, quantity, relevancy and presentation depending on the technical sophistication and experience of an individual user.

Continuing to box 511, the client application 126 instructs the client computing device 106 (FIG. 1) to render a defect report wizard 209 (FIG. 2C) or similar user interface 200c (FIG. 2C) on the display 123 (FIG. 1) of the client computing device. The defect report wizard 209 obtains user inputs for the remaining fields of the defect report 121 that could not automatically be populated.

Moving to box 512, the client application 126 determines if the user has chosen to file a defect report or if the user has selected an option that provides more granularity. For example, the user may have chosen an option presented in the defect report wizard indicating the problem is with a child component of sub component of the user interface object, such as a network page object 303, initially selected. In the event that the user has supplied information indicating the problem is with a sub-component of the user interface object, such as a component object of a selected network page object 303, execution loops back to box 503. Otherwise, if a user has selected to file a defect report and supplied the required information, execution proceeds to box 513.

Proceeding next to box 513, the client application 126 analyzes the defect report to determine if the defect report is the result of user error. User error may be detected in a number of ways. For example, the defect report wizard 209 may present the user with one or more questions asking the user to further classify or describe the alleged defect. Categories and answers would also be provided to the user. The user could then select one or more categories or answers in response. Certain responses might indicate that the issue is user error rather a defect in the network page component.

An illustrative example, according to various embodiments of the present disclosure, is when a user attempts to report a defect regarding the calculation of the shipping price for an order. The user might attempt to file a defect report indicating that a shipping charge is incorrect. For example, the user might mistakenly think that the order is entitled to free shipping, but is unaware that free shipping is only available for orders above a minimum threshold such as a total purchase price or total number of items. When the client application 126 sees that the threshold for free shipping has not been met, it knows that the issue is user error. If it is determined that the defect report actually reflects user error, execution proceeds to box 515. Otherwise, execution proceeds to box 516.

Referring next to box 515, the client application 126 informs the user of the error. To continue with the free shipping example illustrated above, the client application 126 may indicate through a dialog, window, prompt, or other user interface object or element that the user has not met the minimum threshold for free shipping or that a particular item within the order is ineligible for free shipping.

Finally moving to box 516, the client application 126 determines the appropriate entity to which the defect report 121 should be sent. The determination is made by referencing the node 403 (FIG. 4) in the defect reporting tree 400 (FIG. 4) corresponding to the network page object the user selected in box 503. Once the determination is made, the defect report 121 is finalized and sent across the network 109 (FIG. 1) by one of any number of appropriate protocols.

Figure 6:
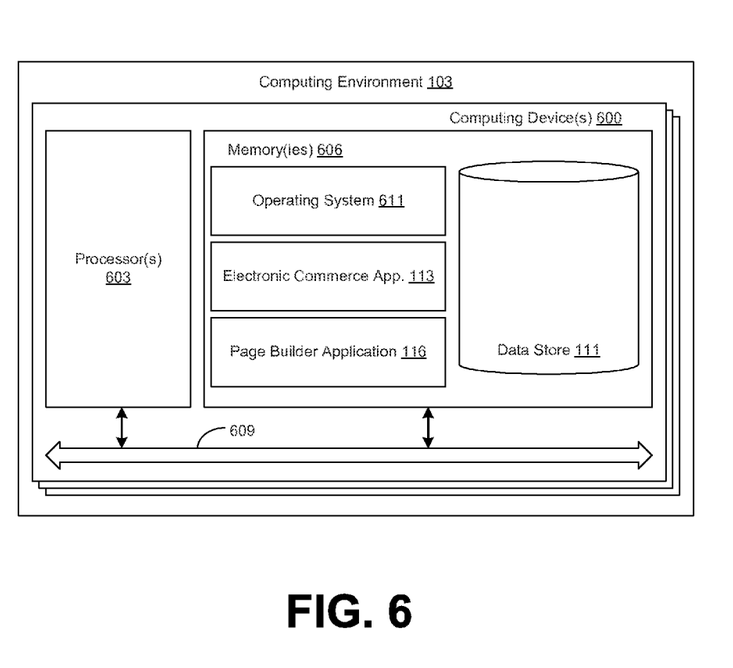
FIG. 6 is a schematic block diagram that provides one example illustration of a computing environment employed in the networked environment of FIG. 1 according to various embodiments of the present disclosure.

With reference to FIG. 6, shown is a schematic block diagram of the computing environment 103 according to an embodiment of the present disclosure. The computing environment 103 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are an electronic commerce application 113, a user interface builder application 116, and potentially other applications. Also stored in the memory 606 may be a data store 111 and other data. In addition, an operating system 611 may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the electronic commerce application 113, the user interface builder application 116, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 5 shows the functionality and operation of an implementation of portions of the user interface builder application 116 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 113 and the user interface builder application 116, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
generating, by a computing device, a network page comprising a plurality of network page objects, wherein at least one network page object comprises at least one subordinate page object;
determining, by the computing device, that a debug flag is present in a uniform resource locator (URL) of a request for the network page;
determine that the request for the network page originates from a previously authorized internet protocol (IP) address; and
in response to a first determination that the debug flag is present in the URL of the request for the network page and a second determination that the request for the network page originates from the previously authorized internet protocol (IP) address, embed individual defect reporting logic into the plurality of network page objects of the network page, wherein the individual defect reporting logic is configured to obtain particular reporting information specific to a respective network page object and causes a computing device rendering the network page to:
determine, in response to obtaining a user interaction to file a defect report related to a network page object, at least one required field for the defect report from a node associated with the network page object of a defect reporting tree associated with the network page;
automatically populate the at least one required field of the defect report with an identifier of the network page object, wherein the identifier of the network page object is included in the network page; and
cause a defect report wizard to be rendered on a display in response to obtaining the user interaction to file the defect report.

2. The method of claim 1, wherein the node of the defect reporting tree defines:
at least one entity responsible for a defect associated with the network page object; and
the at least one required field for the defect report.

3. The method of claim 1, wherein the defect report wizard obtains user inputs to populate the at least one required field of the defect report.

4. A system, comprising:
a computing device comprising a processor and a memory; and
a user interface builder application executable in the computing device, the user interface builder application comprising machine readable instructions stored in the memory that, when executed by the processor, cause the computing device to at least:
generate a network page comprising a plurality of user interface objects, wherein the at least one user interface object comprises at least one subordinate user interface object;
determine that a debug flag is present in a request for the network page;
determine that the request for the network page originates from a previously authorized internet protocol (IP) address; and
in response to a first determination that the debug flag is present in the request for the network page and a second determination that the request for the network page originates from the previously authorized internet protocol (IP) address, embed individual defect reporting logic into the plurality of user interface objects, wherein the individual defect reporting logic is configured to obtain particular reporting information specific to a respective user interface object and causes a computing device rendering the network page to:
determine, in response to obtaining a user interaction to file a defect report related to the user interface object, at least one required field for the defect report from a node associated with the user interface object of a defect reporting tree associated with the network page;
automatically populate the at least one required field of the defect report with an identifier of the user interface object, wherein the identifier of the user interface object is included in the network page; and
cause a defect report wizard to be rendered on a display in response to obtaining the user interaction to file the defect report.

5. The system of claim 4, wherein the node of the defect reporting tree defines:
at least one entity responsible for a defect associated with the user interface object; and
the at least one required field for the defect report.

6. The system of claim 4, wherein the defect reporting logic attempts to automatically populate the at least one required field of the defect report with information known to an application associated with the user interface object during execution of the application associated with the user interface object.

7. The system of claim 4, wherein the defect report wizard obtains a user input to populate the defect report.

8. The system of claim 4, wherein the user interface builder application further comprises machine readable instructions that cause the computing device to at least determine that the debug flag is present before embedding the individual defect reporting logic into the user interface object of the network page.

9. A method comprising:
obtaining, by at least one computing device, a request for a network page having defect reporting logic;
assembling by the at least one computing device, the network page from a plurality of network page components;
embedding, by the at least one computing device, an individual defect reporting component into respective network page components of the network page by consulting a defect reporting tree to determine an appropriate defect reporting component to be embedded into the respective network page component, wherein the individual defect reporting component is configured to obtain particular reporting information specific to a respective network page component; and sending, by the at least one computing device, the assembled network page to a requesting client device.

10. The method of claim 9, wherein the defect reporting tree includes information regarding an entity who should receive a defect report related to a particular network page component.

11. The method of claim 9, further comprising receiving selection of a network page component and initiating a process of reporting a defect associated with the network page component by obtaining the information specific to the network page component.

12. The method of claim 11, further comprising providing a first list of possible defects to be selected for the respective network page component, wherein the first list of possible defects is different than a second list of possible defects that is associated with a different network page component.

13. The method of claim 12, wherein the first list of possible defects is directly embedded as an attribute of the network page component.

14. The method of claim 12, further comprising receiving a defect report for the network page component from the requesting client device and storing the defect report in a defect storage database.

15. The method of claim 14, wherein the defect report is analyzed by the at least one computing device and determined to not contain a user error before the defect report is stored.

16. The method of claim 9, wherein the individual defect reporting component defines required fields of information needed for the defect report of the respective network page component.

17. The method of claim 16, further comprising populating a portion of the required fields with data available to a client application which is rendering the network page at run time.

18. The method of claim 17, wherein the client application comprises a web browser.

19. The method of claim 9, wherein the plurality of network page components include at least one user interface object.

20. The method of claim 9, wherein the request comprises a uniform resource link, wherein the uniform resource link contains a variable that is set to indicate that the defect reporting logic is to be embedded in the network page.

21. The method of claim 9, further comprising authenticating the request by verifying an authentication credential of a user that submitted the request before assembling the network page.

22. The method of claim 21, further comprising assembling the network page without an embedded defect reporting component when the authentication of the request fails.

* * * * *